(12) United States Patent
Bruck

(10) Patent No.: US 9,186,724 B2
(45) Date of Patent: Nov. 17, 2015

(54) ELECTROSLAG AND ELECTROGAS REPAIR OF SUPERALLOY COMPONENTS

(75) Inventor: Gerald J. Bruck, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 540 days.

(21) Appl. No.: 13/571,708

(22) Filed: Aug. 10, 2012

(65) Prior Publication Data

US 2014/0044991 A1 Feb. 13, 2014

(51) Int. Cl.
| | |
|---|---|
| *B22D 19/10* | (2006.01) |
| *B22D 27/02* | (2006.01) |
| *B22D 27/20* | (2006.01) |
| *B23K 9/038* | (2006.01) |
| *B23K 9/04* | (2006.01) |
| *B23P 6/00* | (2006.01) |
| *B23K 25/00* | (2006.01) |
| *F01D 5/00* | (2006.01) |

(52) U.S. Cl.
CPC ............... *B22D 19/10* (2013.01); *B23K 9/038* (2013.01); *B23K 9/042* (2013.01); *B23K 25/005* (2013.01); *B23P 6/007* (2013.01); *F01D 5/005* (2013.01); *B23K 2201/001* (2013.01); *F05D 2230/80* (2013.01); *F05D 2300/175* (2013.01); *Y10T 428/12986* (2015.01)

(58) Field of Classification Search
CPC ........ B22D 19/10; B22D 27/02; B22D 27/20; B23P 6/007
USPC .......... 164/48, 492, 496, 497, 91, 92.1, 122.1
See application file for complete search history.

(56) References Cited

U.S. PATENT DOCUMENTS

| | | | | |
|---|---|---|---|---|
| 3,569,987 | A | * | 3/1971 | Yonemochi et al. .......... 75/10.62 |
| 3,620,287 | A | * | 11/1971 | Medovar et al. ............... 164/470 |
| 3,788,383 | A | * | 1/1974 | Metz ........................... 164/449.1 |
| 4,292,010 | A | | 9/1981 | Meerham et al. |
| 4,326,580 | A | * | 4/1982 | Wada et al. .................... 164/497 |
| 4,463,797 | A | * | 8/1984 | Berg ............................. 164/492 |
| 4,544,019 | A | * | 10/1985 | Kodama et al. ............... 164/496 |
| 4,841,117 | A | | 6/1989 | Koromzay |
| 5,701,669 | A | | 12/1997 | Meier |

(Continued)

FOREIGN PATENT DOCUMENTS

| | | |
|---|---|---|
| EP | 0815993 A1 | 7/1998 |
| EP | 1459829 A1 | 9/2004 |

(Continued)

*Primary Examiner* — Kevin P Kerns

(57) ABSTRACT

Superalloy component castings, such as turbine blades and vanes, are fabricated or repaired by an electroslag or electrogas welding process that at least partially replicates the crystal structure of the original cast substrate in a cast-in-place substrate extension. The process re-melts the base substrate surface and grows it with new molten filler material. As the base substrate and the filler material solidify, the newly formed "re-cast" component has a directionally solidified uniaxial substrate extension portion that at least in part replicates the crystalline structure of the base substrate. The "re-cast" component can be fabricated with a unified single crystal structure, including the extension portion. In other applications, a substrate extension can replicate a directionally solidified uniaxial crystal structure of an original base substrate casting. Polycrystalline substrate base structures can be re-cast with a substrate extension that replicates base substrate crystals that are most parallel to the uniaxial casting direction.

12 Claims, 5 Drawing Sheets

(56) References Cited

U.S. PATENT DOCUMENTS

2004/0026380 A1    2/2004   Holzgruber
2005/0173092 A1    8/2005   Kennedy et al.

FOREIGN PATENT DOCUMENTS

EP    2105245 A2    3/2009
JP    S62282796 A    8/1987

* cited by examiner

ELECTROSLAG AND ELECTROGAS REPAIR OF SUPERALLOY COMPONENTS

BACKGROUND OF THE DISCLOSURE

1. Field of the Invention

The invention relates to repair of service-degraded superalloy component castings, such as turbine blades and vanes. More particularly the invention relates to repair or new fabrication of superalloy component castings by an electroslag welding process that re-melts a base substrate casting surface and grows it within a pool of molten filler material. As the combined melted material solidifies it forms a cast-in-place substrate extension that at least partially replicates the original substrate casting's crystal structure.

2. Description of the Prior Art

"Structural" repair of service-degraded gas turbine or other superalloy component castings is commonly recognized as replacing damaged material with matching alloy material and achieving properties, such as strength, that are close to the original manufacture component specifications (e.g., at least seventy percent ultimate tensile strength of the original specification). For example, it is preferable to perform structural repairs on turbine blades that have experienced surface cracks or blade tip erosion, so that risk of further cracking is reduced, and the blades are restored to original material structural and dimensional specifications.

Structural repair or new fabrication of nickel and cobalt based superalloy material that is used to manufacture turbine components, such as cast turbine blades, is challenging, due to the metallurgic properties of the finished blade material. For example, a superalloy having more than 6% aggregate aluminum or titanium content, such as CM247 alloy, is more susceptible to strain age cracking when subjected to high temperature welding than a lower aluminum-titanium content X-750 superalloy. The finished turbine blade alloys are typically strengthened during post casting heat treatments which render them difficult to perform subsequent structural welding. Currently used welding processes for superalloy structural fabrication or repair generally involve substantial melting of the substrate adjoining the weld preparation, and complete melting of the welding rod or other filler material added, in order to repair cracks or build up eroded surfaces. When a blade constructed of such a material is welded with filler metal of the same or similar alloy, the blade is susceptible to solidification (aka liquation) cracking within and proximate to the weld, and/or strain age (aka reheat) cracking during subsequent heat treatment processes intended to restore the superalloy original strength and other material properties comparable to a new component.

Alternative superalloy welding processes, including laser microcladding with chill fixtures, welding in so called "hot" boxes at elevated temperatures, and inertia friction welding may still lead to post weld heat treatment strain age cracking. Other friction welding processes, such as friction stir welding, can reduce superalloy cracking propensity, but the employed welding apparatus has relatively limited tool life. The alternative superalloy welding processes are not well-suited for rebuilding large gross volume of eroded component substrate material, such as for example rebuilding of an eroded turbine blade tip or vane.

In comparison to structural repair or fabrication, "cosmetic" repair or fabrication of superalloys is recognized as replacing damaged material (or joining two components of newly fabricated material) with unmatching alloy material of lesser structural property specifications, where the localized original structural performance is not needed. For example, cosmetic repair may be used in order to restore the repaired component's original profile geometry, including relatively mild turbine blade tip or vane erosion. As noted above, it is desirable to perform structural repairs on surface cracks in order to reduce their likelihood of subsequent spreading when the component is returned to service. Conversely, an example of cosmetic repair is for filling surface pits (as opposed to structural cracks) on a turbine blade airfoil in order to restore its original aerodynamic profile, where the blade's localized exterior surface is not critical for structural integrity of the entire blade. Cosmetic repair or fabrication is often achieved by using oxidation resistant weld or braze alloys of lower strength than the blade body superalloy substrate, but having higher ductility and lower application temperature that does not negatively impact the superalloy substrate's material properties.

Given the shortcomings of superalloy structural repair welding, often the only commercially acceptable solution is to scrap damaged turbine blades that require structural repair, because past experience has shown limited success of such structural repairs. Thus repairs have been limited to those that have in the past been proven to be performed successfully by alternative superalloy welding processes described above, or by cosmetic welding, employing more ductile welding rod filler materials with reduced structural strength.

Thus, a need exists in the art for a method for performing structural fabrication of superalloy component castings, or a method for performing structural repairs on surfaces of service-degraded superalloy component castings, such as turbine vanes and blades, so that structural cracks, eroded surfaces and other surface defects can be repaired.

Another need exists in the art to increase successful rates of structural repairs of service-degraded superalloy component castings, such as turbine vanes and blades, so that damaged component scrap rates can be reduced.

Yet another need exists in the art for a method for performing structural fabrication of superalloy component castings, or repairs on surfaces of service-degraded superalloy component castings, such as turbine vanes and blades, that do not require complex welding or post-repair heat treatment procedures.

SUMMARY OF THE INVENTION

Accordingly, an object of the invention is to perform structural fabrication of superalloy component castings, or to perform repairs on surfaces of service-degraded superalloy component castings, such as turbine vanes and blades, so that structural cracks, eroded surfaces and other surface defects can be repaired.

Another object of the present invention is to increase the likelihood of performing successful structural repair of superalloy component castings, such as turbine vanes and blades, so that damaged component scrap rates can be reduced.

Yet another object of the present invention is to perform structural fabrication of superalloy component castings, or repairs on surfaces of service-degraded superalloy component castings, such as turbine vanes and blades, that do not require complex welding or post-repair heat treatment procedures.

These and other objects are achieved in accordance with the present invention method of fabricating superalloy component castings; or repairing service-degraded superalloy component castings by an electroslag welding process that at least partially replicates the crystal structure of the original cast substrate in a cast-in-place substrate extension. The methods of the present invention essentially "re-cast" a superalloy base substrate casting by growing a cast-in-place substrate extension on the base substrate. The process of the present invention re-melts the base substrate surface and grows it with new molten filler material. In some embodiments as the base substrate and the filler material solidify, the newly formed "re-cast" component has a directionally solidified uniaxial substrate extension portion that at least in part replicates the crystalline structure of the base substrate. In other embodiments the extension portion replicates the crystalline structure of the base substrate. For example, the "re-cast" component can be fabricated with a unified single crystal structure, including the extension portion. In other examples, a substrate extension can replicate a directionally solidified uniaxial crystal structure. In other examples a polycrystalline substrate base structure can be re-cast with a substrate extension that replicates crystals in the base substrate that are most parallel in preferred growth direction to the uniaxial casting direction of the substrate extension.

The present invention features a superalloy component comprising a base substrate casting having a first crystal structure and a cast-in-place directionally solidified uniaxial substrate extension bonded to the base substrate. The substrate extension has a second crystal structure that is at least a partially replicated extension of the first crystal structure.

The present invention also features a method for casting a superalloy component. A superalloy base substrate is placed in communication with a cavity formed within a mold. At least one metallic electrode is inserted in the mold cavity. Granulated flux is added to the surface of the substrate. The electrode and substrate are coupled electrically in series to a current source of a resistance heating apparatus. The resistance heating apparatus is used to pass and regulate a current flow between the electrode and substrate, for initiating an arc, melting the flux, forming a conductive slag that extinguishes the arc, and creating an electroslag layer over a molten metal pool within the mold cavity that is in contact with the substrate. Thereafter the molten metal solidifies unidirectionally with the base substrate, creating a substrate extension that is grown in conformity with the mold cavity as the molten metal solidifies. This process is akin to electroslag welding.

The present invention additionally features a method for repairing a superalloy turbine blade or vane component by placing the component base substrate in communication with a cavity formed within a mold. At least one superalloy metallic electrode is inserted in the mold cavity. The electrode and substrate are coupled electrically in series to a current source of a heating apparatus. The apparatus is used to pass and regulate a current flow between the electrode and substrate. An arc is initiated between (and causes melting of) electrode and substrate. Shielding of the molten pool from reaction with air is provided by external gas or by flux in the core of the electrode wire. The molten metal pool is in contact with the substrate. Thereafter the molten metal solidifies unidirectionally with the base substrate, creating a substrate extension that is grown in conformity with the mold cavity as the molten metal solidifies. The process is akin to electrogas welding.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of embodiments of the present invention can be readily utilized in fabricating or repairing superalloy component castings, such as turbine blades and vanes, by an electroslag or electrogas welding process that at least partially replicates the crystal structure of the original cast substrate in a cast-in-place substrate extension. The process re-melts the base substrate surface and grows it with new molten filler material. As the base substrate and the filler material solidify, the newly formed "re-cast" component has a directionally solidified uniaxial substrate extension portion that at least in part replicates the crystalline structure of the base substrate.

Figure 1:
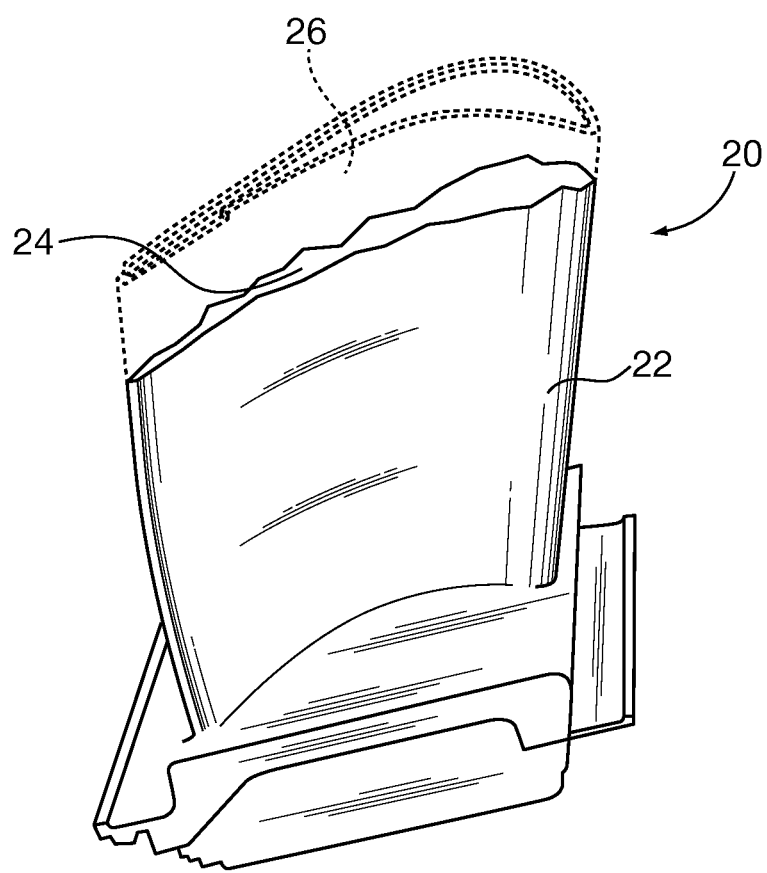
FIG. 1 shows a perspective view of a service-degraded superalloy turbine blade casting.

FIG. 1 shows an exemplary turbine blade superalloy casting 20 having a base substrate 22 and a service-degraded eroded surface 24. The dashed lines 26 show the blade 20 original profile that is to be replaced when performing the repair process of the present invention.

Figure 2:
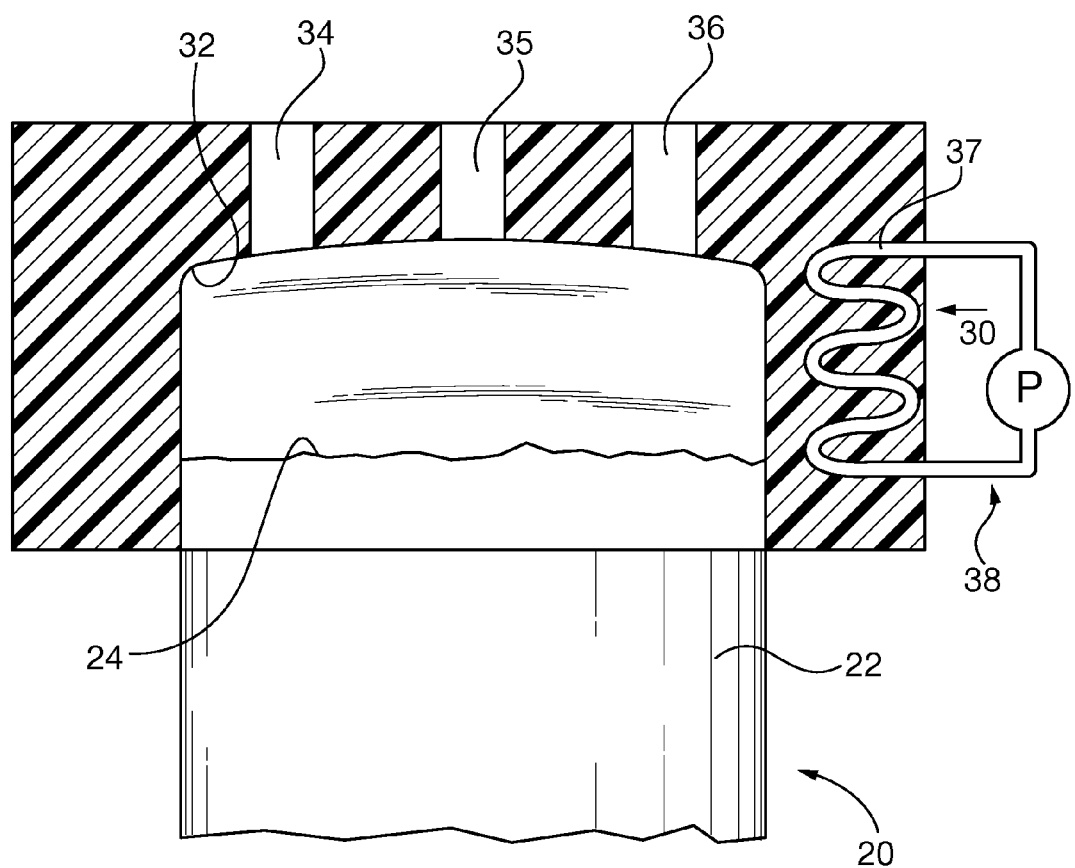
FIG. 2 is an elevational schematic view of an exemplary mold that is used to repair the blade casting of FIG. 1.

Referring to FIG. 2, a mold 30 is placed over the blade 20 so that the eroded surface 24 is in communication with mold cavity 32. In this exemplary embodiment the mold cavity has an internal profile that matches the blade 20 desired original profile. The mold cavity 32 profile can be varied as desired, including providing an oversize profile so that the repaired blade's profile can be recontoured to match desired physical dimensions by known grinding processes. The mold can be fabricated with internal heat exchange passages 37 mating with a heat exchanger 38, for passage of heating or cooling fluid. The mold 30 shown in FIG. 2 also has external passages 34, 35, 36 in communication with the mold cavity 32, for receipt of one or more electrodes. Alternatively the top of the mold 30 can have an open design. Mold materials to be used include ceramics, copper or plated copper, with or without heating or cooling passages 37.

Figure 3:
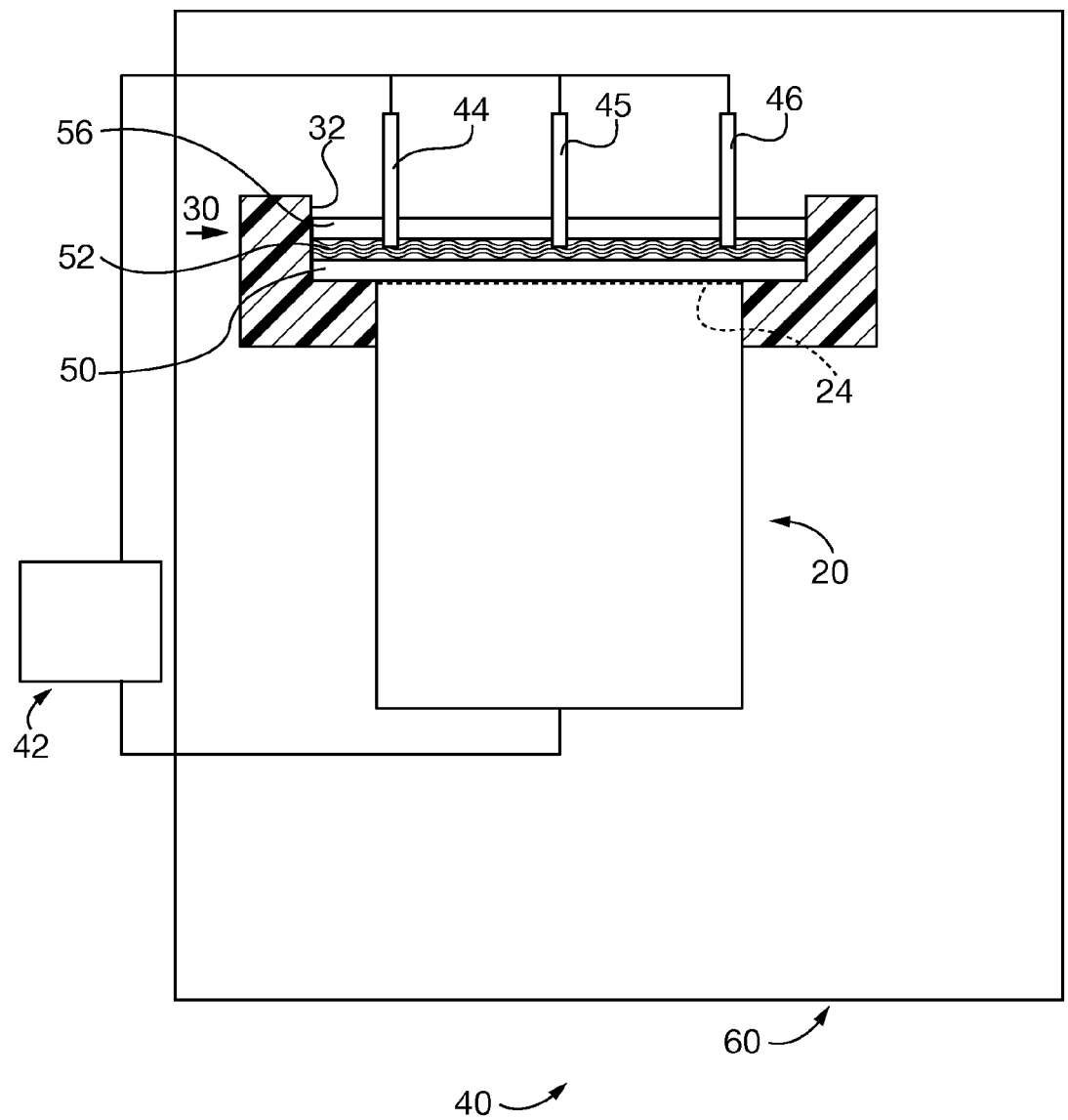
FIG. 3 is an elevational schematic view of an electroslag welding apparatus of the present invention.

An electroslag welding process is performed by the system 40, shown in FIG. 3. In this schematic view the mold 30 is shown as an open-top trough surrounding the blade 20. The system 40 includes a known resistance heating welding apparatus 42 of known construction that is customarily used to perform electroslag welding operations. At least one metallic electrode—here three electrodes 44, 45, 46—are inserted in the mold cavity 32 in proximity to the base substrate surface 24 and electrically coupled in series with the turbine blade 20 base substrate and the welding apparatus 42. The electrodes 44-46 can include solid or cored wire or sheets of filler metal. A regulated current flow is passed between the electrodes 44, 45, 46 and the turbine blade 20 superalloy metal base substrate, causing a high-temperature electrical arc that melts both the superalloy base substrate surface 24 and the metallic electrodes, and forming a molten pool 52. Granulated flux is added to the mold cavity 32. The arc melts the flux and a slag layer 56 forms on the molten metal pool 52 surface, which extinguishes electrical arcs formerly generated between the electrodes 44-46 and the substrate surface 24. The molten metal pool 52 is captured between the substrate surface 24 and the slag layer 56. Welding apparatus 42 current flow is regulated to facilitate continuous electrode melting, deposition in the molten pool and progression of solidification uniaxially in an upward direction away from the original substrate surface 24, forming a solid substrate extension 50, comprising the former electrodes 44-46 metal. The welding system 40 optionally may be incorporated within an isolation chamber 60 to isolate the electroslag welding process from ambient atmosphere, for example to control oxidation formation in the welding zone. The isolation chamber 60 may be a vacuum chamber or one that includes an inert gas, such as argon, reactive gasses or reducing gasses.

Figure 4:
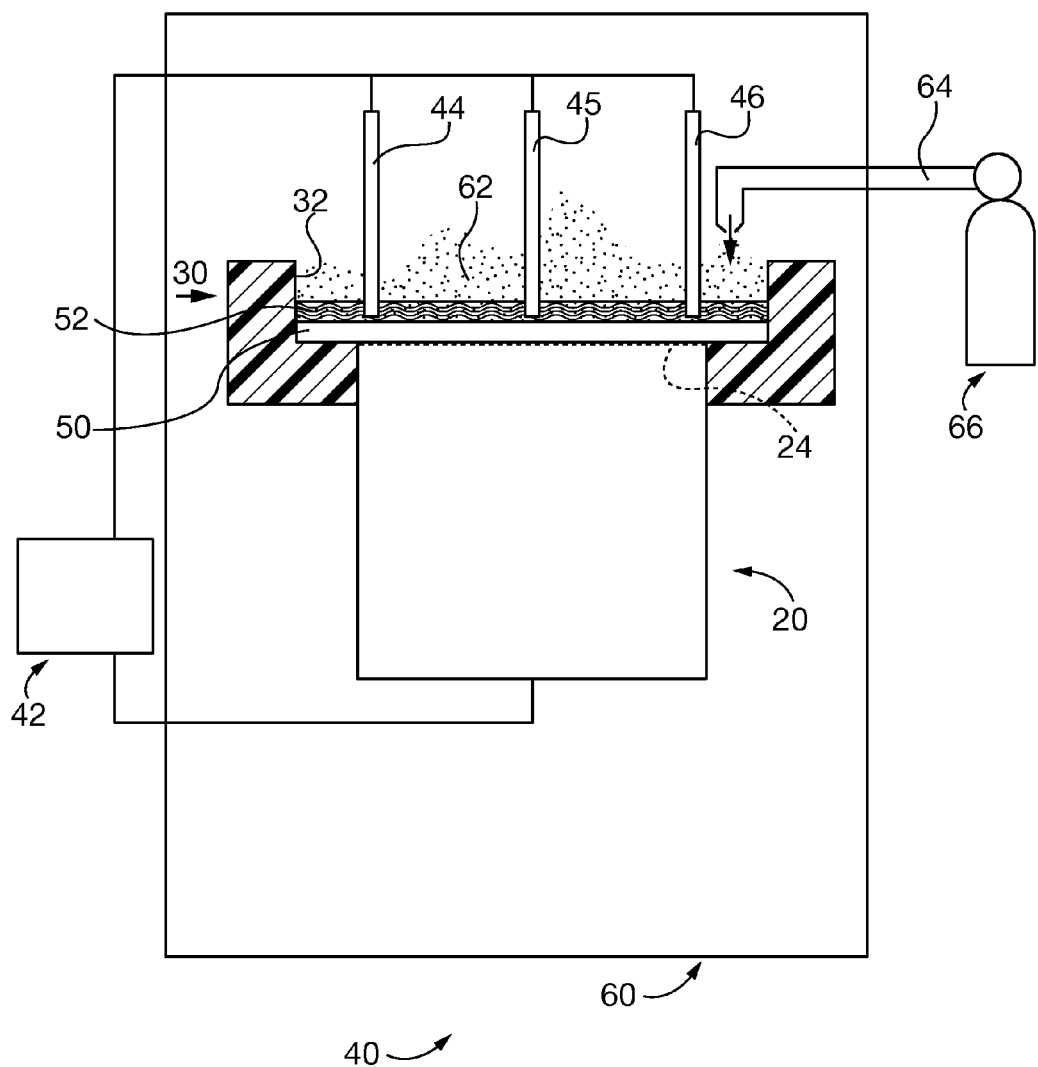
FIG. 4 is an elevational schematic view of an electrogas welding apparatus of the present invention.

Alternatively the superalloy recasting process may employ a known electrogas welding process, shown in FIG. 4, with a shielding gas layer 62 substituted for an electroslag layer and optionally within an isolation chamber 60. The gas layer 62 is delivered into the mold cavity 32 above the molten metal 52 by a gas delivery system 64 and a gas source 66.

The electrode 44-46 metal alloy composition is chosen to be compatible with that of the base substrate turbine blade 20, and preferably is the same alloy as the blade 20. Different filler metal alloys may be utilized in different zones within the repair substrate extension 50. When the electrode metal alloy matches the original base substrate alloy the substrate extension 50 is essentially a cast-in-place "recasting" of the original blade 20, extending from the original service-degraded substrate surface 24. The electroslag/electrogas welding process provides a means for the blade or other casting substrate 20 crystal structure along the substrate surface 24 to resume directional solidification, by simultaneously forming a melt pool 52 over the entire end of a directionally solidified component wherein each crystal in the base substrate surface can resume growth in the same direction that it was originally cast.

Figure 5:
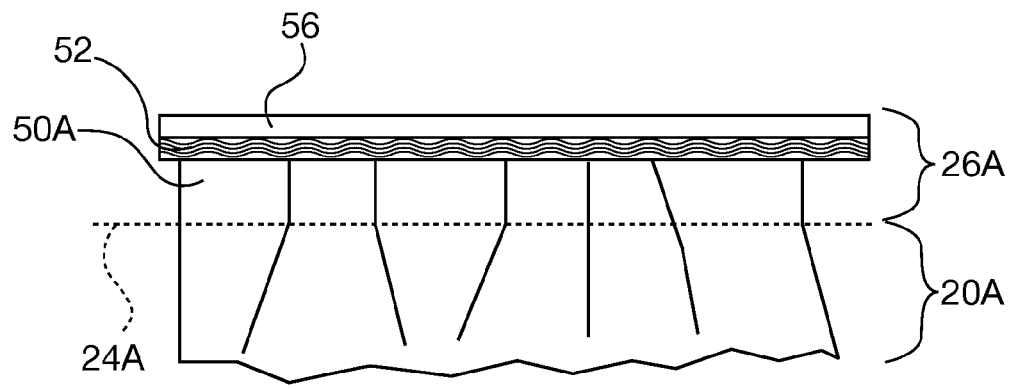
FIG. 5 is an elevational schematic view of a directionally solidified uniaxial crystal casting superalloy component, showing solidification growth of a matching crystal structure substrate extension.
Figure 6:
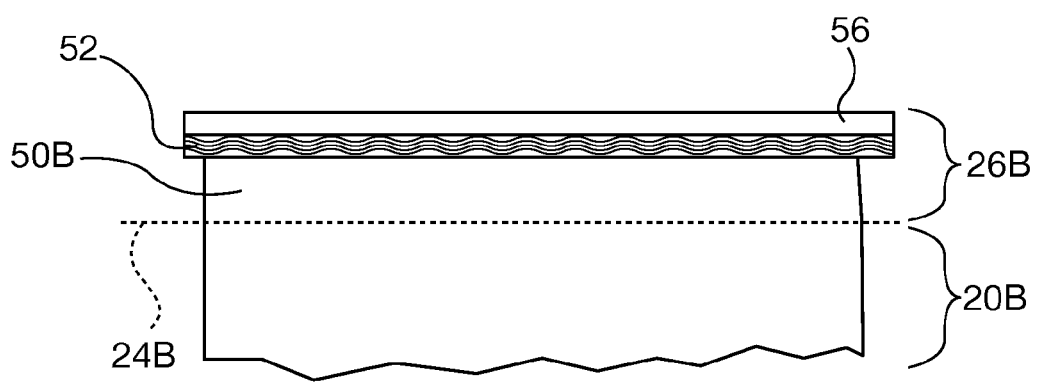
FIG. 6 is an elevational schematic view of a single crystal casting superalloy component, showing solidification growth of a single crystal substrate extension.
Figure 7:
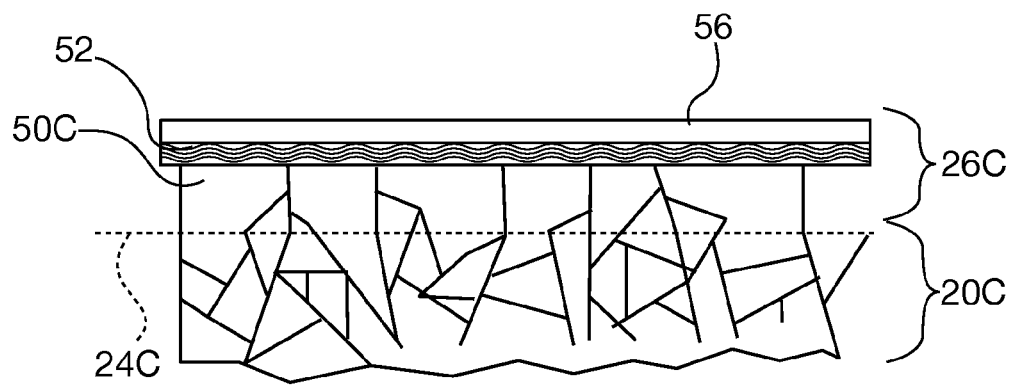
FIG. 7 is an elevational schematic view of a polycrystalline casting superalloy component, showing solidification growth of a structure substrate extension, which replicates crystals in the component base substrate that are most parallel in preferred growth direction to the uniaxial casting direction of the substrate extension.

The repaired former service-degraded component casting is now a renewed, recast component with a base substrate casting having a crystal grain structure and a cast-in-place directionally solidified uniaxial substrate extension having a second crystal grain structure that at least partially replicates the base substrate crystal structure. If, as shown in FIG. 5, the original blade base substrate casting 20A has a directionally solidified uniaxial crystal structure, then the substrate extension 50A that forms the repaired portion 26A of the blade has a matching crystal structure. The plane for initiation of such extension is 24A. Similarly, if as shown in FIG. 6 the original blade base substrate casting 20B has a single crystal structure, then the substrate extension 50B that forms the repaired portion 26B of the blade continues the single crystal structure. The plane for initiation of such extension is 24B. In the case of a polycrystalline structure original blade substrate casting 20C, shown in FIG. 7, the substrate extension 50C that forms the repaired portion 26C of the blade replicates crystals in the base substrate surface 24, initiating and extending from plane 24C, that are most parallel in preferred growth orientation to the substrate extension's uniaxial casting direction. Grains less favorably oriented will be crowded out by those that are most parallel to the casting direction.

While the invention embodiments described herein have shown repair of service-degraded turbine blades or vanes, the methods and apparatus of the present invention can be used to fabricate new superalloy components by inserting a starter base substrate casting in the mold cavity and fabricating the rest of the component structure from the base substrate.

The electroslag/electrogas fabrication and repair methods of the present invention facilitate structural fabrication of new superalloy component castings, or repair of surfaces of service-degraded superalloy component castings, such as turbine vanes and blades, so that structural cracks, eroded surfaces and other surface defects can be repaired reliably, with reduced component scrap rates. Compared with other known superalloy castings welding repair procedures, those of the present invention do not require complex welding or post-repair heat treatment procedures. Good metallurgical bonds are achieved between the original superalloy base substrate and the repaired substrate extension with the present invention repair techniques. In many instances, when using the present invention repair techniques, directionally solidified or single crystal grain structures can be developed in the repaired region that are not possible with other known welding repair techniques. The present invention repair techniques generate low internal stresses within the repaired component that are akin to those generated in an original casting procedure, with relatively higher additive repair deposition rates than known laser microcladding, gas tungsten arc welding procedures. Known multi-pass, multi-layer welding repair procedures that are necessary when rebuilding an eroded, service-degraded component volume create higher internal stresses within the repaired component and have a propensity to create inter-pass defects between the multiple layers. The known multi-pass restorative welding processes have lower deposition rates than the single-pass, continuously formed material restoration processes of the present invention.

Although various embodiments which incorporate the teachings of the present invention have been shown and described in detail herein, those skilled in the art can readily devise many other varied embodiments that still incorporate these teachings.

What is claimed is:

1. A method for casting a superalloy component, comprising:
   providing a superalloy base substrate turbine blade or turbine vane, and a selectively variable temperature mold that defines a cavity therein, the cavity having a profile with axial height and radial planform circumference dimensions;
   placing the base substrate in communication with the mold cavity;
   inserting at least one metallic electrode in the mold cavity;
   coupling the electrode and substrate electrically in series to a current source of a heating apparatus;
   passing and regulating a current flow between the electrode and substrate for creating an arc and a molten metal pool within the mold cavity that is in contact with the substrate;
   inducing, within the mold cavity, in a growth direction extending upwardly from the substrate, growth of a solidified substrate extension having a unidirectional-crystalline structure parallel to the cavity axial height dimension, by selectively varying mold temperature by cooling the mold above the molten metal pool, so that a temperature gradient induced within the substrate extension is also parallel to the cavity axial height dimension, and thereafter solidifying unidirectionally the molten metal with the base substrate, thereby creating the substrate extension;

shielding the pool from reaction with air with a shielding composition of external gas or flux; and growing the substrate extension in conformity with the mold cavity profile as the molten metal solidifies.

2. The method of claim 1, wherein the base substrate is a casting having a first crystal structure, the substrate extension grown therein has a directionally solidified uniaxial second crystal structure that is at least a partially replicated extension of the first crystal structure.

3. The method of claim 2, further comprising the base substrate having a directionally solidified uniaxial first crystal structure, with the substrate extension second crystal structure being a replicated extension of the first crystal structure.

4. The method of claim 3, wherein the first and second crystal structures comprise a unified single crystal structure.

5. The method of claim 2, wherein the base substrate first crystal structure comprises a polycrystalline structure and the second crystal structure replicates crystals in the substrate that are most parallel to the uniaxial casting direction of the substrate extension.

6. The method of claim 1, comprising growing the substrate extension by an electroslag method.

7. The method of claim 1 further comprising adding flux over the molten pool created by the arc that then forms a conductive slag, the slag extinguishing the arc and creating an electroslag layer over the molten pool within the mold cavity, the molten pool in contact with the substrate.

8. The method of claim 1 wherein the electrode is the source of material forming the substrate extension and the electrode material is identical to the base substrate material or combinations of material both identical to and different from the base substrate material.

9. The method of claim 1, wherein the base substrate is a newly manufactured component or a repaired component.

10. The method of claim 1, further comprising selectively varying mold temperature with an external heating system, such that heat transfer between mold contents, the mold and the external heating system induces a temperature gradient in the substrate extension that is parallel to and not transverse to the growth direction.

11. The method of claim 1, further comprising isolating the component from ambient air by placing it in a chamber selected from the group consisting of an inert gas chamber and a vacuum chamber.

12. A method for repairing a superalloy component, comprising:

providing a superalloy base substrate turbine blade or turbine vane, and a selectively variable temperature mold that defines a cavity therein, the cavity having a profile with axial height and radial planform circumference dimensions;

placing the base substrate in communication with the mold cavity;

inserting a superalloy metallic electrode and flux in the mold cavity;

coupling the electrode and substrate electrically in series to a current source of a resistance heating apparatus;

passing and regulating a current flow between the electrode and substrate for creating an electroslag layer that covers a molten metal pool within the mold cavity, which molten metal is in contact with the substrate;

inducing, within the mold cavity, in a growth direction extending upwardly from the substrate, growth of a solidified substrate extension having a unidirectional-crystalline structure parallel to the cavity axial height dimension, by selectively varying mold temperature by cooling the mold above the molten metal pool, so that a temperature gradient induced within the substrate extension is also parallel to the cavity axial height dimension, and thereafter solidifying unidirectionally the molten metal with the base substrate, thereby creating the substrate extension; and growing the substrate extension in conformity with the mold cavity profile as the molten metal solidifies.

\* \* \* \* \*